United States Patent [19]
Fortune et al.

[11] Patent Number: 5,623,429
[45] Date of Patent: Apr. 22, 1997

[54] TECHNIQUES FOR EXPEDITIOUSLY PREDICTING ELECTROMAGNETIC WAVE PROPAGATION

[75] Inventors: Steven J. Fortune, Summit; Reinaldo A. Valenzuela, Holmdel, both of N.J.

[73] Assignee: Lucent Technologies Inc., Murray Hill, N.J.

[21] Appl. No.: 223,630

[22] Filed: Apr. 6, 1994

[51] Int. Cl.⁶ .................................................. G06T 17/00
[52] U.S. Cl. ........................................ 364/578; 455/67.6
[58] Field of Search .................................. 364/578, 524; 455/67.6

[56] References Cited

U.S. PATENT DOCUMENTS

| | | | |
|---|---|---|---|
| 4,093,918 | 6/1978 | Hitney | 364/524 |
| 4,933,889 | 6/1990 | Meshkat et al. | 364/578 |
| 5,079,703 | 1/1992 | Mosher et al. | 364/421 |
| 5,301,127 | 4/1994 | Hitney | 364/525 |
| 5,327,359 | 7/1994 | Hitney | 364/550 |
| 5,450,615 | 9/1995 | Fortune et al. | 364/550 |
| 5,467,401 | 11/1995 | Nagamitsu et al. | 381/63 |

OTHER PUBLICATIONS

Design of a High Power Test Model of the PEP–II RF Cavity, Schwarz et al, IEEE, May 1993, pp. 1039–1041.
Three Dimensional RF Scattering by the Finite Element Method, D'Angelo et al, IEEE, Oct. 1990, pp. 3827–3832.
Path Loss and Cell Coverage of Urban Microcells in Urban High Rise Building Environments, IEEE, pp. 266–270, Niu et al.
Field and Wave Electromagnetics, Cheng, 1983, p. 235.
J. W. McKown and R. Lee Hamilton, Jr., "Ray Tracing as a Design Tool for Radio Networks," *IEEE Network Magazine*, Nov. 1991, pp. 27–30.
W. Honcharenko, et al., "Mechanisms Governing UHF Propagation on Single Floors in Modern Office Buildings," *IEEE Transactions on Vehicular Technology*, vol. 41, No. 4, Nov. 1992, pp. 496–504.

*Primary Examiner*—Kevin J. Teska
*Assistant Examiner*—Matthew Loppnow

[57] ABSTRACT

Techniques are disclosed for optimizing the prediction of RF propagation. A three-dimensional environment, such as a building, is modeled as a plurality of two-dimensional cross-sectional areas including a plurality of surfaces. Each surface is associated with a reflection coefficient and a transmission coefficient. A reference transmitter location and a plurality of reference receiver locations are selected. For each reference receiver location, RF propagation paths are determined with respect to the reference transmitter location. The reference transmitter location and the reference receiver locations represent propagation path endpoints. A plurality of parallel planes are used to partition the three-dimensional environment into a plurality of intervals. The RF reflective surfaces and propagation paths within each interval are projected into a cross-sectional area. A plurality of line segments are positioned in the cross-sectional area to form a plurality of triangular areas.

10 Claims, 3 Drawing Sheets

TECHNIQUES FOR EXPEDITIOUSLY PREDICTING ELECTROMAGNETIC WAVE PROPAGATION

Technical Field

This invention relates generally to systems and methods for predicting the propagation of electromagnetic waves, and more specifically to techniques for optimizing the efficiency of predicting the indoor coverage area of wireless transmission systems.

BACKGROUND OF THE INVENTION

The task of establishing RF communication links is especially challenging in indoor environments because building elements (e.g., concrete, metal partitions) affect radiation patterns in a complex, significant manner. Antenna placement is if critical factor in determining the overall effectiveness of indoor RF communication links and because of the great complexity of the surrounding environment (from the standpoint of RF propagation), trial-and-error methods are used to arrive at suitable antenna locations.

Due to the significant complexities involved in performing exact RF propagation calculations, various techniques for estimating or predicting RF field strength have been developed. Illustrative examples of propagation models are disclosed in "Ray tracing as a design tool for radio networks", by J. W. McKown and R. L. Hamilton, *IEEE Network Magazine*, Vol. 5, No. 6, pp. 27–30, Nov. 1991, and "Mechanisms governing UHF propagation on single floors in modem office buildings", by W. Honcharenko, H. L. Bertoni, J. Dailing, J. Qian, and H. D. Yec, *IEEE Transactions on Vehicular Technology*, Vol. 41. No. 4, pp. 496–504, Nov. 1992. These RF propagation models facilitate the calculation of RF field strength values by implementing one or more simplifying assumptions.

The simplifying assumptions implemented by prior art propagation prediction techniques do not sufficiently enhance computational efficiency for many practical, real-world applications. For example, the ray-tracing prediction technique disclosed in the above-cited article entitled "Ray Tracing as a Design Tool for Radio Networks" is much too time-consuming for the purpose of comparatively and expeditiously evaluating a plurality of antenna locations out in the field. What is needed is an improved approximation technique for analytically characterizing and optimizing indoor RF communications systems. For these applications, it is not generally necessary to have exact agreement between predicted and measured field strength values. Rather, for the purpose of comparatively evaluating several possible indoor communication system design alternatives, it is more important to characterize average field strength values at locations throughout the desired service area.

SUMMARY OF THE INVENTION

A technique is disclosed for optimizing the prediction of RF propagation. A three-dimensional environment, such as a building, is modeled as a plurality of surfaces, each surface having a reflection coefficient and a transmission coefficient. The plurality of surfaces are determined by using a plurality of parallel planes to partition the three-dimensional environment into a plurality of volumetric intervals. For each volumetric interval, the surfaces within this interval are projected onto a planar cross-sectional area. A plurality of line segments are positioned within the cross-sectional area to form a plurality of triangle walls, the plurality of triangle walls and the plurality of surfaces partitioning each cross-sectional area into a plurality of triangular areas. RF propagation paths, each path having first and second propagation pat$_h$ endpoints and traversing n triangles, are traced across a cross-sectional area by identifying an nth triangle selected from the plurality of triangles and containing a first propagation path endpoint. For the nth triangle, the triangle wall intersecting the propagation path is determined, and an (n−1)th triangle sharing this triangle wall is identified. n is decremented by one, and the determination and identification steps are repeated recursively until a second propagation path endpoint is reached. The propagation path endpoints represent reference receiver locations and/or reference transmitter locations. The foregoing approach provides an expeditious technique for predicting RF propagation.

DETAILED DESCRIPTION OF THE PREFERRED EMBODIMENTS

It is generally known to those skilled in the art that radio propagation in an indoor or outdoor environment can be predicted using a ray-tracing approach. The propagation prediction techniques disclosed herein can be advantageously employed in the operational environment of ray tracing. An illustrative example of ray-tracing is set forth in the aforementioned article entitled "Ray Tracing as a Design Tool for Radio Networks".

Figure 1:
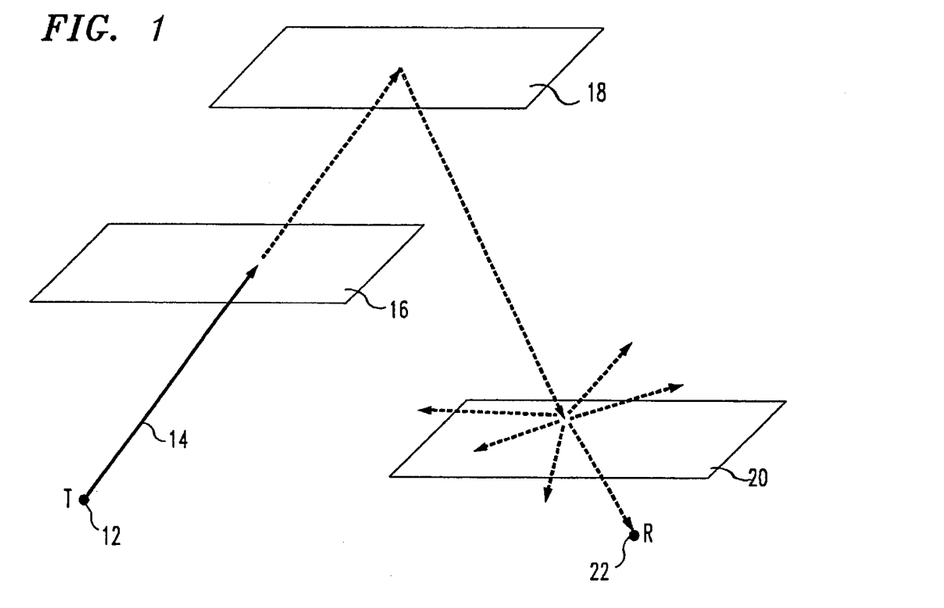
FIG. 1 is a perspective view illustrating a ray tracing technique employed for the prediction of RF field strength.

Referring to FIG. 1, ray tracing techniques represent RF energy as a ray 14 moving through three-dimensional space. Ray 14 originates at a reference transmitter location (T) 12, and moves in a straight line until a surface such as RF obstacle 16, 18, or 20 is encountered. The path of ray 14 is determined by the nature and composition of RF obstacles 16, 18, 20. For example, ray 14 passes through RF obstacle 16 along a straight-line path, but the energy of the ray is reduced in the process. RF obstacle 18 reflects ray 14 according to the laws of optics, and RF obstacle 20 scatters the ray, dividing the single incident ray 14 traveling in one direction into many reflected rays, each reflected ray traveling in a different direction, with the energy of the single incident ray being distributed amongst the relatively large number of reflected rays. In the case of an RF obstacle having one or more sharp corners, diffraction effects may cause ray 14 to bend. After encountering surfaces such as RF obstacles 16, 18, and 20, ray 14 is received at reference receiver location (R) 22.

The reference transmitter point (T) 12 may be conceptualized as a test point from which it is desired to locate fixed elements of a communications system, such as a system base station antenna. The reference receiver location (R) 22 may be conceptualized as a potential operational site for a portable communications device. It is often desired to provide a reliable communications link between reference transmitter point (T) 12 and a plurality of reference receiver locations (R) 22 scattered throughout the building. Since propagation path losses are reciprocal, it is to be understood that transceivers and/or receivers may, in practice, operate from reference transmitter point (T) 12. Similarly, transceivers and/or transmitters may, in practice, operate from reference receiver point (R) 22.

As described above, reference transmitter point (T) 12 may represent a trial location for a system base station antenna. Ideally, this antenna should be positioned at a location which provides optimum RF coverage within the building, such that, when the system base station antenna transmits a signal, the received RF power at virtually all locations within the building exceeds a predetermined value.

In this manner, reliable RF communication links will be provided throughout the entire building, whereas nulls and weak-signal areas will be minimized or nonexistent.

The RF energy of ray 14 is calculated at any arbitrarily-selected point in a three-dimensional environment by using an inverse power relationship where received power is inversely proportional to the distance of the propagation path between T 12 and the arbitrarily selected point, such as R 22. Attenuation caused by reflections, diffraction, scattering, and transmission through an obstruction are also considered. These inverse power relationships and attenuation calculations are well-known to those skilled in the art and are set forth, for example, in a textbook entitled "Fields and Waves in Communications Electronics" by S. Ramo, J. R. Whinnery, and T. Van Duzer, published by John Wiley & Sons, 1967.

Figure 2:
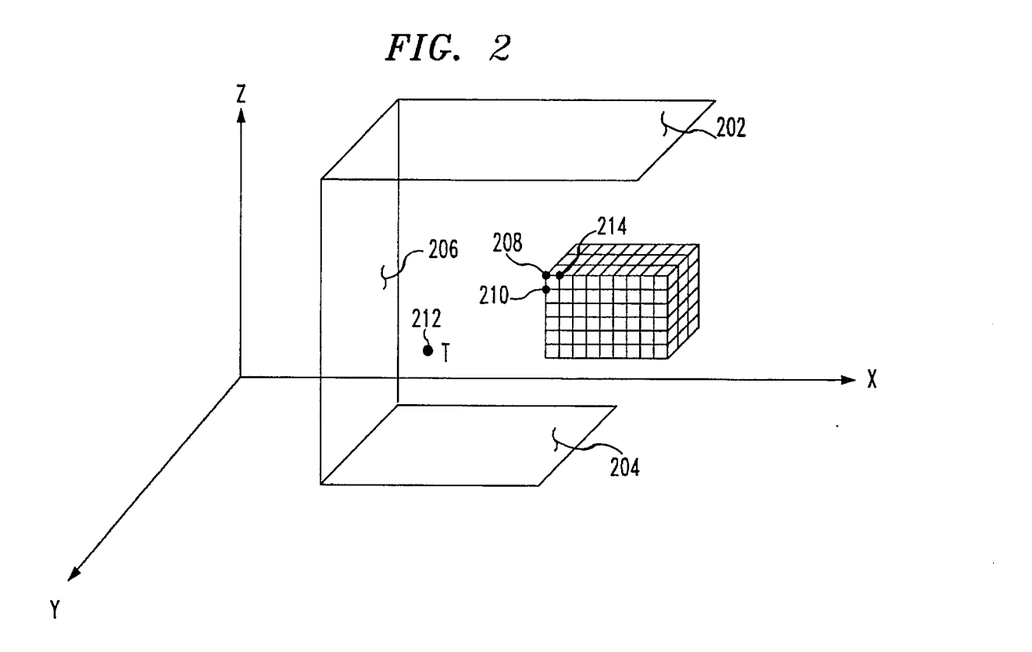
FIG. 2 is a perspective view illustrating the division of a three-dimensional environment into a grid of reference receiver locations.

Surfaces such as RF obstructions 16, 18, and 20 may be walls, partitions, and/or other structural elements of a building, enclosed area, or the like. These structural elements may include, for example, steel structural members, steel-reinforced concrete, metallic partitions, non-metallic partitions, plumbing, electrical conduit, sheet-metal air ducts, aluminum-backed fiberglass insulation, metallic doors, furniture, and other objects. Computer simulation of propagation requires a model of these obstructions. Referring now to FIG. 2, the model preferably consists of a set of two-dimensional surfaces, i.e., rectangles, distributed in three-dimensional space. For example, horizontal surface 202 represents a ceiling, horizontal surface 204 represents a floor, and vertical surface 206 represents a wall. Each surface is associated with an RF obstruction specification setting forth the transmission and/or reflection coefficient corresponding to the obstruction. The transmission coefficient is defined as the amount of RF power traveling through an RF obstruction divided by RF power incident upon the obstruction. Similarly, the reflection coefficient is the ratio of reflected RF power to incident RF power. In this manner, the RF obstruction specification may be used to characterize the RF properties of typical structural elements, such as sheet rock walls, steel-reinforced concrete floors, and corrugated steel ceilings.

In the example of FIG. 2, it is desired to optimize the coverage of an RF communications system operating in the area bounded by horizontal surfaces 202 and 204, and vertical surface 206. Accordingly, this area is partitioned to create a grid of reference receiver locations 208, 210, 214. A reference transmitter location (T) 212 is selected, and the RF power received at each of the reference receiver locations 208, 210, 214 is predicted using the triangulation techniques to be described hereinafter.

Although it is theoretically possible to consider virtually all propagation paths from T 212 to a given reference receiver location 208, 210 or 214, this would result in computational inefficiencies. In practice, the number of paths actually considered is limited by placing an upper bound on the number of changes in direction allowed for any propagation path. The RF energy received at a given receiver location, such as receiver location 208, is calculated by summing up the individual propagation losses attributable to each individual propagation path from T 212 to receiver location 208. All propagation paths up to a predetermined number of surface reflections are considered.

Various methods known to those skilled in the art may be employed to calculate the RF propagation loss of a given propagation path. For example, the transmission and reflection coefficients for both horizontal and vertical polarizations may be computed for each surface using a recursive analysis approach. Recursive analysis is described in the textbook "Fields and Waves in Communications Electronics" by S. Ramo, J. R. Whinnery, and T. Van Duzer, published by John Wiley & Sons, 1967. In applying this recursive analysis approach, simplifying assumptions may be made to enhance computational efficiency, while at the same time providing results of sufficient accuracy for most practical communication system design problems. For example, all antennas, such as those used at T 212 and/or receiver locations 208, 210, 214, are assumed to be vertical half-wave dipoles. One may also assume that each surface, such as vertical surface 206 and horizontal surfaces 202 and 204, will reflect RF energy in a manner so as to provide substantially specular reflections. This assumption is valid for approximately smooth surfaces such as walls. Furthermore, it may be assumed that all surfaces are orthogonal, in the sense that these surfaces are conceptualized as being situated in a plane formed by lines parallel to any of two axes including the x, y, and z axes. This assumption is valid for many buildings in existence today. However, if a given building contains curved, diagonal, irregular, and/or arbitrarily-angled surfaces, these surfaces can be represented using more complex mathematical expressions at the expense of computational efficiency.

For each surface, the reflection coefficients and transmission coefficients may be sampled, i.e., measured empirically. The transmit and receive antenna patterns may be sampled as well, using standard field-strength calculations well known to those skilled in the art and described, for example, in the above-cited Ramo textbook. Sampling may be conducted with a resolution as high as ten samples per degree, and the sampled values can be stored in look-up tables.

The propagation prediction process begins with the calculation of a received power value for the direct RF propagation path joining T 2 12 and a specified reference receiver location 210. This direct path is the straight-line path from the reference transmitter location 210 to the reference receiver location 212, which may or may not pass through a surface such as a wall, but which does not include reflections from surfaces. The direct :path received power values are calculated using a standard free-space propagation formula, where flee-space loss is conceptualized as being a function of the total path length. These free-space propagation formulas are known to those skilled in the art and are set forth, for example, in the Ramo reference. In addition to free-space losses, transmission losses must also be considered. Transmission losses result when the propagation path passes through an obstruction such as a surface. This transmission loss (i.e., the transmission coefficient) is determined and normalized using empirical measurements, and/or in accordance with the procedures described in the aforementioned Ramo textbook. For example, if the direct path does not include any obstacles, the transmission coefficient, i.e., the normalized transmission loss, is 1, whereas if an obstacle completely blocks an RF signal, the normalized transmission loss is 0. The total propagation loss for the direct path is calculated as the product of the free-space loss and the normalized transmission losses. The power received at the receiver location 210 from the direct path may be determined from the total direct path propagation loss. These calculations are well known to those skilled in the art, and are performed using conventional methods such as those set forth in the Ramo reference.

Next, received power for all one-reflection RF propagation paths are calculated, followed by all paths involving two reflections. One-reflection paths involve one reflection from one surface, whereas two-reflection paths involve a first reflection from a first surface followed by a second reflection from a second surface. This received power calculation process may be repeated to encompass any desired number of reflections. However, high-order reflections may have a minor impact on the total power received at the reference receiver location 210, relative to lower-order reflections. Furthermore, the number of possible high-order paths can be considerably higher than the number of lower-order paths, resulting in lower computational efficiencies with no useful improvement in accuracy.

The received power values for the reflection paths are calculated using the free-space propagation formula set forth above. In addition to the free-space loss, however, reflection and transmission losses must also be considered. Reflection losses result from the reflection of electromagnetic energy incident upon a surface. These losses may be normalized, i.e., specified as a reflection coefficient, such that a reflection loss of 1 signifies a perfect reflection where all of the incident electromagnetic energy is reflected from the surface. A normalized reflection coefficient of 0 signifies that none of the electromagnetic energy incident upon the surface is reflected. Reflection losses are determined in accordance with the procedures set forth in greater detail in the Ramo reference, and/or measured empirically. Transmission losses on the reflection path must be considered if the reflection path passes through any obstacles. These transmission losses were described above in connection with direct path losses.

The total path loss for a given reflection path is computed as the product of the free-space loss, the normalized reflection loss, and any normalized transmission loss. After the total path loss for a given reflection path has been determined, it is possible to calculate the power received at the receiver point from this reflection path. This calculation is performed using methods well known to those skilled in the art and disclosed in the Ramo reference. Once the losses for all reflection paths up to a specified number of reflections have been calculated, the total received power at the reference receiver location 210 is calculated as the scalar sum of the received power values for the direct path and the reflection paths considered above. Note that reflection path losses and direct path losses can be scaled for different types of antennas simply by multiplying the total calculated path loss by the antenna power gain in the direction of interest.

It is to be understood that the concepts of reference transmitter location and reference receiver location are employed throughout the specification and drawings for analytical purposes to determine propagation path losses. Since propagation path loss is reciprocal, it is possible to exchange the roles of these locations, such that the transmitter location becomes the receiver location and the receiver location becomes the transmitter location. Furthermore, it is to be understood that, in practice, an indoor wireless system may employ both transmitters and receivers at reference receiver locations, and both transmitters and receivers may be used at reference transmitter locations. Alternatively, a transmitter may be used at the receiver location, and a receiver at the transmitter location. For example, the reference transmitter location selected for purposes of propagation prediction is typically the proposed location of a system base station which includes a transceiver, whereas the receiver location is selected in the general location where portable units are to be employed. These portable units may contain transceivers.

If ray tracing is used to calculate propagation path losses, imaging techniques may be employed. Starting at a reference receiver location 210, the propagation path is traced backwards, in a direction opposite to the direction of travel of the RF energy. Once the tracing process encounters a first reflective surface, the location of the reference receiver location 210 image is determined relative to the first reflective surface. This receiver antenna image location is conceptualized as the first order image location of the receiver antenna, and the propagation path is traced backwards from the first reflective surface until a second reflective surface is encountered. The image location of the first order image about the second reflective surface is determined, and may be conceptualized as the second order image location. This process is recursively repeated until no new reflective surfaces are encountered. It is then possible to calculate the overall path length of the reflection path by referring to the distance between the reference transmitter location 212 and the highest-order image location.

The coordinates for the image of a point (i.e., the reference receiver location 210) reflecting over a surface are found by reflecting the coordinate corresponding to the axis parallel to the surface normal. For example, assume a reference receiver location 210 having coordinates (a, b, c). A reflecting surface, such as vertical rectangle 206, is situated parallel to the yz plane and located at a distance D along the x axis. The image of reference receiver location 210 has coordinates (2D-a, b, c). In this manner, the coordinates of the highest order image of the receiver location 210, for an arbitrary path involving multiple reflections, are found by successively reflecting the receiver location 210 coordinates over the sequence of reflecting surfaces defining the path under consideration.

An arbitrary reflection path may be uniquely specified simply by setting forth the sequence of surfaces reflecting the incident RF energy traveling from the transmitter location 212 to the receiver location 210 along the reflection path. For example, assume that there are four surfaces designated as surface 1, surface 2, surface 3, and surface 4. Reflection path 3-4-2 specifies a path from reference transmitter location 2 12 to surface 3, surface 4, surface 2, and then to reference receiver point 210. Once the coordinates for the highest order image of reference receiver location 210 have been determined, the overall reflection path length is computed as the length of the line joining this image to the reference receiver location 210. This line may be conceptualized as an image path. The image path serves to significantly reduce the mathematical complexities involved in calculating propagation path losses for actual reflection paths. Once the reflection paths have been characterized as set forth above, the reflection path loss and path time delay can be determined using conventional methods known to those skilled in the art. These methods are set forth, for example, in the aforementioned Ramo textbook. Although a ray-tracing process has been described which uses an imaging process, this has been done for illustrative purposes, as the embodiments disclosed herein may also be employed in conjunction with ray-tracing techniques not using imaging processes.

One requirement of ray tracing techniques is the capability of identifying all walls that a given propagation path passes through without changing direction. The relative ease or difficulty with which this function is performed has a significant impact upon the overall efficiency of the ray tracing procedure. For example, conventional ray tracing approaches compare every RF obstruction in a given propagation path with every line segment in the path. This comparison requires approximately n*r calculations, where n is the number of RF obstructions and r is the number of line segments in the propagation path. For example, consider the propagation path shown in FIG. 3. The path commences at reference transmitter location (T) 312, travels along line segment 320 through a first wall 314 which is an RF obstructive surface, reflects off a second wall 306 which is an RF reflective surface, traverses line segment 322, reflects off third wall 302, traverses line segment 324, reflects off fourth wall 304, and traverses line segment 326 to reference receiver location (R) 310. Note that RF obstructive surfaces such as first wall 314 do not change the direction of the RF propagation path, but do attenuate incident RF energy. RF reflective surfaces, such as second, third, and fourth walls 306, 302, 304, respectively, change the direction of the RF propagation path according to the laws of optics, and may or may not attenuate incident RF energy. In this example, conventional ray tracing approaches would require the performance of approximately (4 RF obstructions)*(4 line segments), or 16 calculations to characterize the illustrated RF propagation path.

Figure 3:
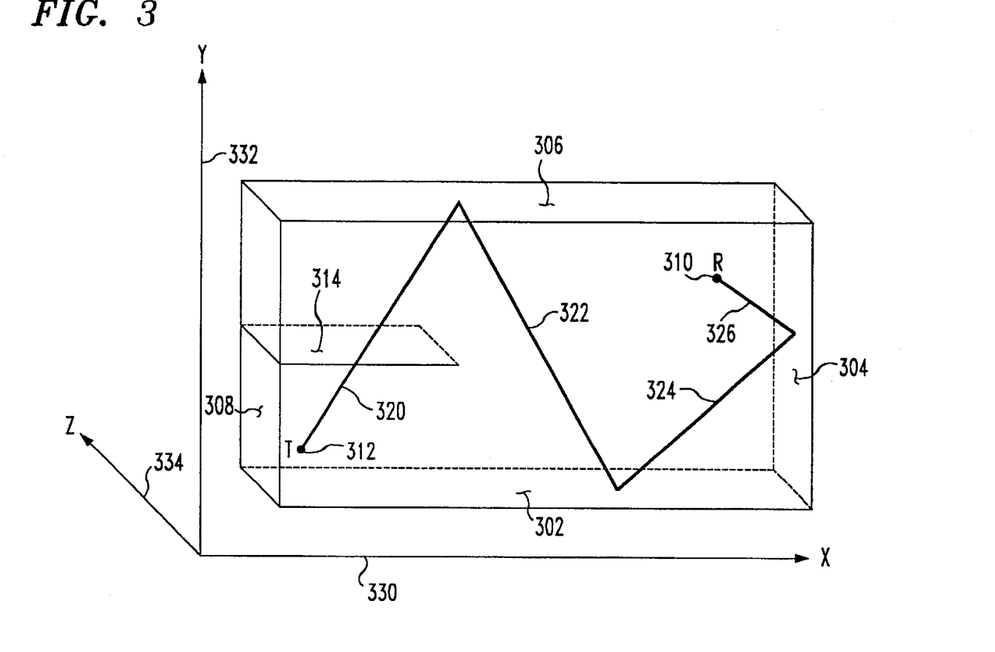
FIG. 3 is a three-dimensional diagram illustrating a propagation path from a reference transmitter location to a reference receiver location.

Although existing ray tracing methods require the performance of approximately 16 calculations for the propagation path shown in FIG. 3, the number of RF obstructions actually intersected is much smaller than 16. By utilizing a novel spatial data structure to be described in greater detail hereinafter, it is possible to reduce the number of required calculations to approximately the number of intersected RF obstructions. In the above-described example, the techniques disclosed herein would reduce the number of required calculations from approximately 16 to approximately 4.

Referring now to FIG. 3, novel techniques are described for calculating propagation path losses. These techniques are utilized in the context of ray tracing to provide enhanced computational efficiency. FIG. 3 sets forth a three-dimensional representation of the RF propagation path, such that all elements, including first, second, third, and fourth walls 314, 306, 302, 304, reference transmitter location T 312, reference receiver location R 310, and line segments 320, 322, 324, and 326 are all shown in a three-dimensional space having an X axis 330, a Y axis 332, and a Z axis 334. A given propagation path may be uniquely specified by setting forth a reference transmitter location T 312, a reference receiver location R 310, and all surfaces (such as second, third, and fourth walls 306, 302, and 304) that cause the RF propagation path to change direction. Note that first wall 314 does not cause the propagation path to change direction, and need not be referenced in order to identify a specific propagation path.

Although some surfaces in a given RF propagation path do not cause incident RF energy to change direction, such as first wall 314, these RF obstructive surfaces must be identified in order to predict RF field strength at the reference receiver location R 310. To identify these non-direction-altering surfaces, conventional techniques compare every surface in a three-dimensional environment with every line segment in a specific propagation path. This comparison process requires approximately (n*r) calculations, where n is the number of surfaces and r is the number of line segments in the propagation path. However, this process may be greatly simplified, as will be described in greater detail hereinafter.

As described above in conjunction with FIG. 3, operational environments for wireless communication systems are three-dimensional and include a plurality of walls, such as RF reflective surfaces and/or RF obstructive surfaces. It is possible to represent these three-dimensional environments in a mathematically simplified form. This is accomplished using one or more two-dimensional cross-sectional areas (for example, in the xy-plane), wherein each cross-sectional area approximates a portion of the three dimensional environment (i.e., xyz-space) across a finite range of values in the third dimension (z).

Figure 4:
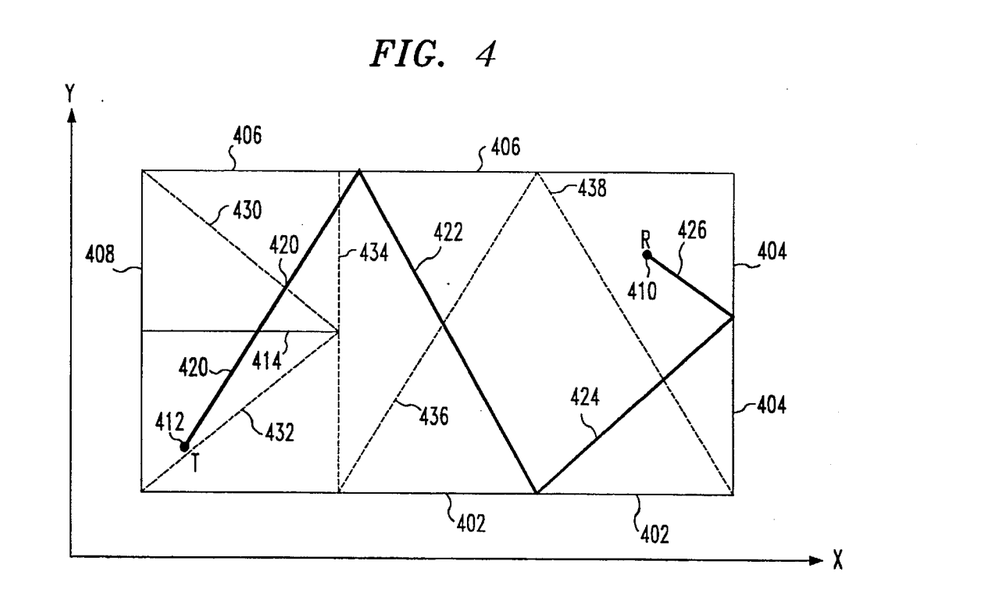
FIG. 4 shows the propagation path of FIG. 3 projected into a two-dimensional plane.

Each cross-sectional area includes a plurality of line segments representing surfaces such as walls and/or partitions. One example of a cross-sectional area is shown in FIG. 4, which is a two-dimensional projection of FIG. 3 in the xy-plane. FIG. 4 includes line segments 420, 422, 424, and 426 corresponding to walls and/or partitions. Reference receiver location R 410 and reference transmitter location T 412 are also indicated. Cross-sectional areas are preferably selected to represent a volume across which a given set of walls or partitions remain constant. The walls and/or partitions represented by the line segments are comprised of RF reflecting, RF attenuating, and/or RF scattering material.

As a practical matter, the number of distinct two-dimensional cross-sectional areas required to represent a given environment is relatively small. Due to the fact that operational environments for wireless communications systems typically include buildings or structures having a plurality of mutually orthogonal surfaces, these environments are especially well-suited to a simplified form of mathematical representation using cross-sectional areas. Although vertical and/or horizontal cross-sectional areas may be employed, the use of horizontal cross-sectional areas (i.e., in the xy-plane of FIGS. 3 and 4) is described for illustrative purposes. However, the use of horizontal cross-sectional areas is preferred in the case of typical buildings which have walls extending from floor to ceiling (or from floor to suspended ceiling). For example, a single story of a typical building may be represented using a first cross-sectional area for the floor, a second cross-sectional area for the ceiling, and a third cross-sectional area for the space between the floor and the ceiling. In the case where a suspended ceiling is used, a fourth cross-sectional area would represent the suspended ceiling, and a fifth cross-sectional area would represent the space between the actual ceiling and the suspended ceiling. Accordingly, a plurality of two-dimensional cross-sectional areas is employed to represent the three-dimensional operational environment of a wireless communications system.

As shown in FIG. 3, an RF propagation path consists of one or more line segments 320, 322, 324, 326 in three-dimensional space. This propagation path can be simplified by projecting the three-dimensional propagation path into the two-dimensional cross-sectional areas, such as the cross-sectional area of FIG. 4. If a given propagation path traverses a plurality of cross-sectional areas, the projection process will generate a plurality of two-dimensional subpaths, each subpath corresponding to a given two-dimensional cross-sectional area. The projection of the propagation path from three dimensions into two dimensions is accomplished using mathematical techniques well-known to those skilled in the art.

FIG. 4 shows a representative two-dimensional cross-sectional area and subpath projected from the three-dimensional RF propagation path of FIG. 3. The projected propagation path to be analyzed may pass through more than one cross-sectional area, in which case the three-dimensional RF propagation path of FIG. 3 must be projected onto a plurality of two-dimensional cross-sectional areas, of which FIG. 4 is but one example. Projecting a three-dimensional environment into a plurality of two-dimensional cross-sectional areas provides enhanced computational efficiency for purposes of predicting RF propagation path losses.

Alter a given operational environment is partitioned into a plurality of cross-sectional areas, each cross-sectional area is partitioned into a plurality of triangular regions by incorporating one or more triangulation line segments 430, 432, 434, 436, 438 (FIG. 4) into the cross-sectional area. The entire cross-sectional area is partitioned, such that every point within the cross-sectional area lies within one of the plurality of triangular regions, and/or on a boundary between two such triangular regions. The triangular regions may be formed from various combinations of line segments representing walls, triangulation line segments, portions of line segments representing walls, and/or portions of triangulation line segments. For example, a first triangle is formed by a portion of wall 406, the entire line segment 430, and a portion of line segment 434. A second triangle is formed by the entire line segment 438, the entire line segment 404, and a portion of line segment 406.

The division of a planar cross-sectional area into a plurality of triangular regions may be accomplished using any of various mathematical triangulation methods well-known to those skilled in the art. The disclosed propagation prediction techniques provide improved computational efficiencies, irrespective of the specific type of triangulation algorithm employed. However, to provide optimized computational efficiency, it is preferable to triangulate each cross-sectional area such that the number of triangulation line segments employed is approximately equal to the total number of line segments representing walls and/or partitions in each cross-sectional area. Suitable triangulation schemes which use this optimized number of line segments are well-known to those skilled in the art.

The triangulated cross-sectional areas provide an analytical framework for expeditiously analyzing one or more RF propagation paths. The usefulness of this technique is based upon a realization that, given a triangle and a line segment of that triangle, the unique other triangle sharing the line segment can be easily located. For example, if the triangulated cross-sectional areas are stored in a computer representation, only one pointer access is required to locate this unique other triangle.

Figure 5:
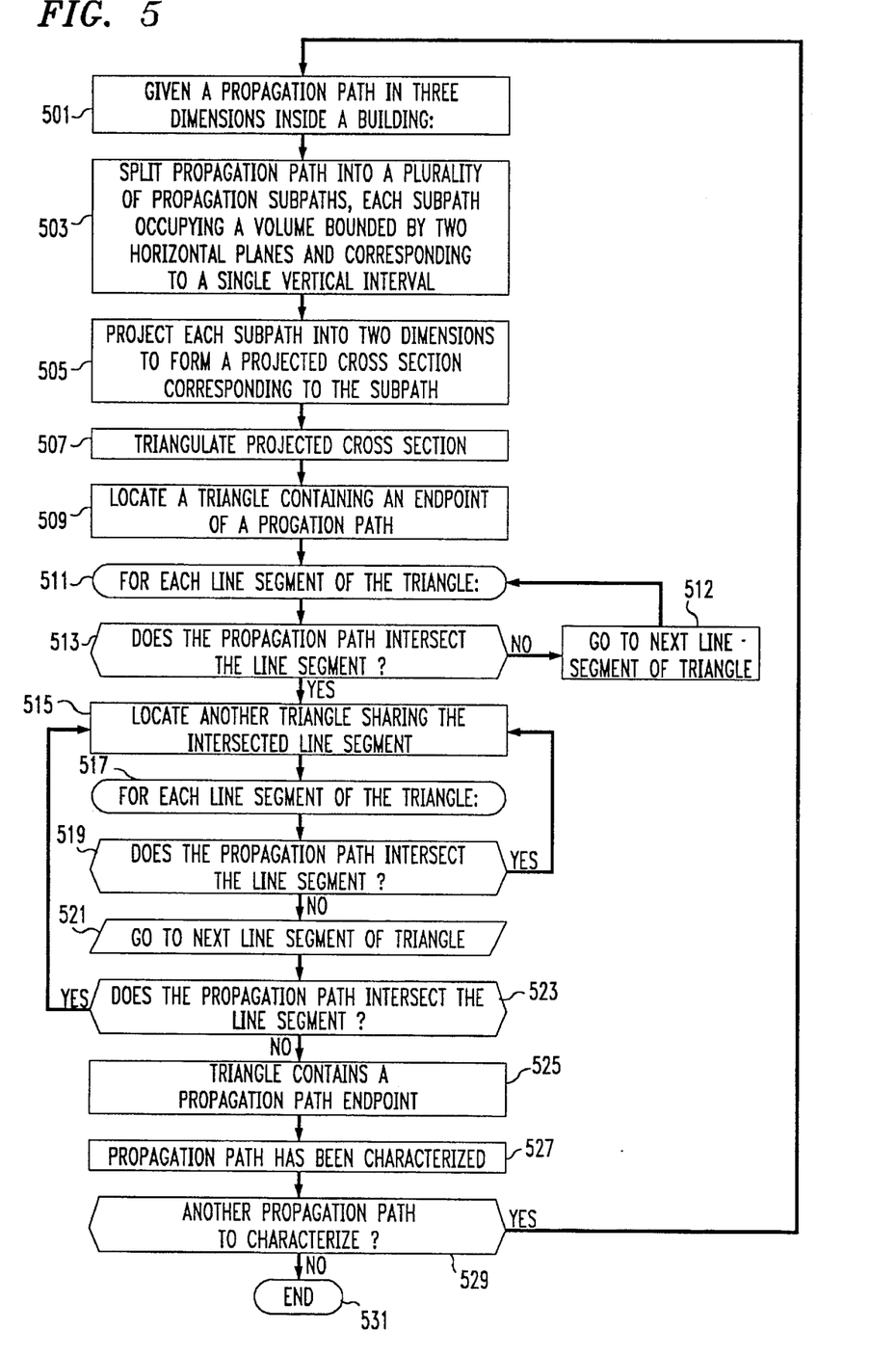
FIG. 5 is a flowchart setting forth a method for predicting RF propagation by ray-tracing and triangulation.

The RF propagation prediction method shown in FIG. 5 is applied to each of the two-dimensional cross-sectional areas generated in accordance with the aforementioned techniques described in connection with FIGS. 3 and 4. With reference to FIG. 5, the program commences at block 501, wherein an arbitrarily-selected three-dimensional propagation path is submitted for further analysis. The selected propagation path is partitioned into a plurality of propagation subpaths at block 503, such that each subpath occupies a volume bounded by two horizontal planes and corresponding to a specific vertical interval. Next (block 505), each subpath, as well as each surface within the vertical interval, is projected into two dimensions to form a projected cross-sectional area corresponding to the subpath.

At block 507, each projected cross-sectional area is triangulated using one or more triangulation line segments. An example of a triangulated cross-sectional area was described in conjunction with FIG. 4. A search is performed at block 509 to locate a triangle containing an endpoint of a propagation path. For each segment of the triangle (block 511), the program performs a test (block 5 13) to ascertain whether or not the propagation path intersects that line segment. If the propagation path intersects the line segment, program control advances to block 515. The negative branch from block 513 leads back to block 512 and then to block 511, where another segment of the triangle is tested.

At block 515, the program identifies another triangle sharing the intersected line segment tested in block 511. Note that, in the case of an area partitioned into triangular regions, only two triangles will share a given portion of a line segment. Therefore, once a given line segment in a first triangle has been identified, there is one and only one unique second triangle adjoining the first triangle which shares this line segment. Each segment of the triangle identified in block 515 is tested at blocks 517 and 519 to determine whether or not the propagation path intersects that line segment. If the propagation path intersects that line segment, program control loops back to block 515, where another triangle sharing the intersected line segment is located. If the propagation path does not intersect that line segment, program control progresses to block 52 1, where the next line segment of the triangle is considered.

A test is performed at block 523 to ascertain whether or not the propagation path intersects the line segment of the triangle considered in block 521. If so, program control loops back to block 515, where another triangle sharing the intersected line segment is identified. The negative branch from block 523 leads to block 525, where it is determined that the triangle contains a propagation path endpoint. At block 527, the propagation path analyzed in the above sequence of operations starting at block 501 has been characterized. Control progresses to block 529 where a test is performed to ascertain whether or not another propagation path is to be characterized. If not, the program ends at block 531. If there is another path to characterize, program control loops back to block 501 and the above-described process is repeated for the new propagation path to be characterized.

The method described in conjunction with FIG. 5 implements calculations which are approximately proportional in number to the number of triangles visited by the propagation path. In turn, the number of visited triangles is given by the number of line segments intersected by the propagation path. The total number of calculations required by the method of FIG. 5 is approximately proportional to the number of line segments intersected which represent actual walls and/or partitions, as contrasted to triangulation line segments which do not represent walls and/or partitions. Note that, on average, approximately half of the line segments in a given cross-sectional area represent actual walls and/or partitions.

It is to be understood that the above-described embodiments are merely illustrative principles of the invention and that variations may be devised by those skilled in the art without departing from the scope of the invention. It is therefore intended that such variations be included within the scope of the following claims.

We claim:

1. A method for optimizing the prediction of RF propagation in a three-dimensional environment comprising a plurality of surfaces, each surface having (i) a reflection coefficient specifying the ratio of reflected to incident RF energy, and (ii) a transmission coefficient specifying the ratio of RF energy transmitted through the surface to RF energy incident upon the surface, the method including the following steps:

(a) selecting a reference transmitter location within the three-dimensional environment;

(b) selecting a plurality of reference receiver locations within the three dimensional environment;

(c) for each reference receiver location, determining at least one RF propagation path between the reference receiver location and the reference transmitter location, the reference transmitter location representing a propagation path endpoint, and the reference receiver locations each representing propagation path endpoints;

(d) partitioning the three dimensional environment into a plurality of intervals along any one of the three dimensions using a plurality of parallel planes;

(e) for each interval, projecting the RF propagation paths and the surfaces within each interval into a two-dimensional cross-sectional area;

(f) inserting a plurality of line segments into each cross-sectional area to form a plurality of triangle walls, the plurality of triangle walls and the projected surfaces together forming a plurality of triangular areas;

(g) for each projected RF propagation path, tracing the projected RF propagation path through n triangular areas in the cross-sectional area by locating an nth triangular area selected from the plurality of triangular areas containing a first propagation path endpoint;

(h) for each of n triangular areas, determining the triangle wall intersecting the propagation path, and identifying an (n−1)th triangular area sharing this triangle wall;

(j) decrementing n by one, and recursively repeating the determination and identification steps set forth in (h) until a second propagation path endpoint is reached.

2. A method for optimizing the prediction of RF propagation in a three-dimensional environment as set forth in claim 1 wherein step (c) further includes the step of determining a plurality of RF propagation paths including a direct path joining the reference transmitter location to a given reference receiver location across a straight-line path, as well as one or more reflection paths joining the reference transmitter location to a given reference receiver location via reflections from one or more surfaces.

3. A method for optimizing the prediction of RF propagation as set forth in claim 2, wherein a plurality of reflection paths are determined such that all reflection paths having up to m reflections are considered, where m is an integer greater than zero.

4. A method for optimizing the prediction of RF propagation as set forth in claim 3 wherein each RF propagation path intersects a plurality of surfaces;

the method further including the step of calculating a propagation component setting forth propagation loss relative to free-space propagation as the product of the magnitude squared of the reflection coefficients and the transmission coefficients corresponding to the plurality of intersected surfaces.

5. A method for optimizing the prediction of RF propagation as set forth in claim 4 further including the step of calculating a local mean of received RF power at each Of the reference receiver locations as the scalar sum of all the propagation components reaching each of the reference receiver locations.

6. A method for predicting RF propagation in a three-dimensional environment including the following steps:

(a) selecting a reference transmitter location and at least one reference receiver location;

(b) determining a plurality of propagation paths between said reference transmitter location and each of said reference receiver locations; said propagation paths including at least one direct path joining said reference transmitter location to one of said reference receiver locations along a straight-line path, and at least one reflection path joining said reference transmitter location to one of said reference receiver locations via at least one surface;

(c) associating each of said surfaces with a reflection coefficient specifying the ratio of reflected to incident RF energy, and a transmission coefficient specifying the ratio of RF energy transmitted through the surface to incident RF energy;

(d) projecting the three-dimensional environment and the plurality of propagation paths into a plurality of two-dimensional cross-sectional areas;

(e) partitioning the two-dimensional cross-sectional areas into a plurality of triangular regions;

(f) for each propagation path, calculating a propagation path component representing propagation loss relative to free-space propagation of RF energy from a reference transmitter at the reference transmitter location producing a reference RF power level, the propagation loss being equal to the product of the magnitude squared of the reflection and transmission coefficients; and (g) for each reference receiver location, calculating a local mean of received power equal to the scalar sum of the powers of all of the propagation path components corresponding to the reference receiver location.

7. The method of claim 6, wherein the propagation component of each reflection path including one reflective surface is calculated using a ray imaging procedure comprising the following steps:

(a) from the at least one reference receiver location, tracing the reflection path backwards, in a direction opposite to the direction of travel of the RF energy, to encounter a first reflective surface;

(b) determining a first reference receiver location image about the first reflective surface as the reference receiver location reflected about a plane including the first reflective surface; and (c) calculating the overall reflection path length as the distance between the reference transmitter point and the first reference receiver location image.

8. The method of claim 6 Wherein the propagation component of each reflection path including m surfaces, m being greater than 1, is calculated using a ray imaging procedure comprising the following steps:

(a) from the at least one reference receiver location, tracing the reflection path backwards, in a direction opposite to the direction of travel of the RF energy, to encounter an mth surface;

(b) determining an mth reference receiver location image about the mth surface as the reference receiver location reflected about a plane including the mth surface;

(c) from the mth surface, tracing the reflection path backwards to encounter an (m−1)th surface;

(d) determining an (m−1)th image about the (m−1)th surface as the nth reference receiver location image reflected about a plane including the (m−1)th surface;

(e) repeating steps (c) and (d) recursively until the reflection path is traced back to the reference transmitter location; and (f) calculating the overall reflection path length as the distance between the reference transmitter point and the last reference receiver location image determined in step (e).

9. A method for predicting RF propagation in a three-dimensional environment including the following steps:

(a) selecting a reference transmitter location and at least one reference receiver location from within the three-dimensional environment; the three-dimensional environment comprising a plurality of surfaces, each surface having (i) a reflection coefficient specifying the ratio of reflected to incident RF energy, and (ii) a transmission coefficient specifying the ratio of RF energy transmitted through the surface to RF energy incident upon the surface;

(b) determining a plurality of propagation paths between said reference transmitter location and each of said reference receiver locations; said propagation paths including at least one direct path joining said reference transmitter location to one of said reference receiver locations along a straight-line path, and at least one reflection path joining said reference transmitter location to one of said reference receiver locations via at least one surface; the reference transmitter location representing a propagation path endpoint, and the reference receiver locations each representing propagation path endpoints;

(c) partitioning the three dimensional environment into a plurality of intervals along any one of the three dimensions using a plurality of parallel planes;

(d) for each interval, projecting the RF propagation paths and the surfaces within each interval into a two-dimensional cross-sectional area;

(e) inserting a plurality of line segments into each cross-sectional area to form a plurality of triangle walls, the plurality of triangle walls and the projected surfaces together forming a plurality of triangles;

(f) for each projected RF propagation path, tracing the projected RF propagation path through n triangles in the cross-sectional area by locating an nth triangle selected from the plurality of triangles containing a first propagation path endpoint;

(g) for each of n triangles, determining the triangle wall intersecting the propagation path, and identifying an (n−1)th triangle sharing this triangle wall;

(h) decrementing n by one, and recursively repeating the determination and identification steps set forth in (g) until a second propagation path endpoint is reached;

(j) for each propagation path, calculating a propagation path component representing propagation loss relative to free-space propagation of RF energy from a reference transmitter at the reference transmitter location producing a reference RF power level, the propagation loss being equal to the product of the magnitude squared of the reflection coefficients and the transmission coefficients associated with the surfaces of the propagation path; and (k) for each reference receiver location, calculating a local mean of received power equal to the scalar sum of the powers of all of the propagation path components corresponding to the reference receiver location.

10. A method for predicting RF propagation in a three-dimensional environment including the following steps:

(a) selecting a reference transmitter location and at least one reference receiver location;

(b) determining a plurality of propagation paths between said reference transmitter location and each of said reference receiver locations; said propagation paths including at least one direct path joining said reference transmitter location to one of said reference receiver locations along a straight-line path, and at least one reflection path joining said reference transmitter location to one of said reference receiver locations via at least one reflective surface;

(c) associating each of said reflective surfaces with a reflection coefficient specifying the ratio of reflected to incident RF energy, and a transmission coefficient specifying the ratio of RF energy transmitted through the surface to incident RF energy;

(d) partitioning the three dimensional environment into a plurality of intervals along any one of the three dimensions using a plurality of parallel planes;

(e) for each interval, projecting the RF propagation paths and the surfaces within each interval into a two-dimensional cross-sectional area;

(f) inserting a plurality of line segments into each cross-sectional area to form a plurality of triangle walls, the plurality of triangle walls and the projected surfaces together forming a plurality of triangles;

(g) for each projected RF propagation path, tracing the projected RF propagation path through n triangles in the cross-sectional area by locating an nth triangle selected from the plurality of triangles containing a first propagation path endpoint;

(h) for each of n triangles, determining the triangle wall intersecting the propagation path, and identifying an (n−1)th triangle sharing this triangle wall;

(j) decrementing n by one, and recursively repeating the determination and identification steps set forth in (h) until a second propagation path endpoint is reached;

(k) for each propagation path, calculating a propagation path component representing propagation loss relative to free-space propagation of RF energy from a reference transmitter at the reference transmitter location producing a reference RF power level, the propagation loss being equal to the product of the magnitude squared of the reflection and transmission coefficients; and (m) for each reference receiver location, calculating a local mean of received power equal to the scalar sum of the powers of all of the propagation path components corresponding to the reference receiver location.

* * * * *